US011230062B2

(12) United States Patent
Fiechter et al.

(10) Patent No.: US 11,230,062 B2
(45) Date of Patent: Jan. 25, 2022

(54) METHOD AND APPARATUS FOR ADDITIVE MANUFACTURING

(71) Applicant: Local Motors IP, LLC, Chandler, AZ (US)

(72) Inventors: Alexis Fiechter, Mesa, AZ (US); Timofei Novikov, Friendsville, TN (US); Robert Bedsole, Knoxville, TN (US); Kyle Rowe, Knoxville, TN (US); Charles Hill, Chandler, AZ (US); David Riha, Knoxville, TN (US)

(73) Assignee: LOCAL MOTORS IP, LLC, Chandler, AZ (US)

( * ) Notice: Subject to any disclaimer, the term of this patent is extended or adjusted under 35 U.S.C. 154(b) by 0 days.

(21) Appl. No.: 16/280,851

(22) Filed: Feb. 20, 2019

(65) Prior Publication Data

US 2019/0255777 A1    Aug. 22, 2019

Related U.S. Application Data

(60) Provisional application No. 62/632,560, filed on Feb. 20, 2018.

(51) Int. Cl.
 *G05B 19/4099* (2006.01)
 *B29C 64/393* (2017.01)
 (Continued)

(52) U.S. Cl.
 CPC .......... *B29C 64/393* (2017.08); *B29C 64/188* (2017.08); *B29C 64/245* (2017.08);
 (Continued)

(58) Field of Classification Search
 CPC ... B29C 64/393; B29C 64/188; B29C 64/245; B23Q 17/2233; B23Q 17/2428;
 (Continued)

(56) References Cited

U.S. PATENT DOCUMENTS 5,207,371 A  *  5/1993  Prinz .................. G05B 19/4099
                                                                228/125
9,600,929 B1 *  3/2017  Young ..................... G06T 17/00
 (Continued)

FOREIGN PATENT DOCUMENTS

EP      3 238 865 A1   11/2017
JP      2012-024920 A   2/2012
WO   WO 2017/106965 A1  6/2017

OTHER PUBLICATIONS

Tyler Koslow, "Water Under World's First 3D Printed Pedestrian Bridge Completed in Madrid," https://all3dp.com/3d-printed-pedestrian-bridge/, Dec. 20, 2016 (Year: 2016).*
(Continued)

*Primary Examiner* — Christopher E. Everett
(74) *Attorney, Agent, or Firm* — Orrick, Herrington & Sutcliffe LLP (57) ABSTRACT

A system for part location and long-range scanning of large additively manufactured structures and method for using the same. In some embodiments, the method for locating and scanning a three-dimensional (3D) object comprises scanning a first portion of the 3D object from a first position via a long-range scanner on a mobile platform, determining whether additional portions of the 3D object require scanning, moving the long-range scanner via the mobile platform to a second position based on said determination that additional portions of the 3D object require scanning, and aligning each portion of the scanned 3D object.

19 Claims, 10 Drawing Sheets

(51) Int. Cl.
*B29C 64/245* (2017.01)
*B29C 64/188* (2017.01)
*B33Y 10/00* (2015.01)
*B33Y 30/00* (2015.01)
*B33Y 50/02* (2015.01)

(52) U.S. Cl.
CPC .......... *G05B 19/4099* (2013.01); *B33Y 10/00* (2014.12); *B33Y 30/00* (2014.12); *B33Y 50/02* (2014.12)

(58) Field of Classification Search
CPC .......................... B23Q 17/20; B23Q 17/2471; G05B 19/4099; B33Y 50/02; B33Y 30/00; B33Y 10/00; G06T 7/33
See application file for complete search history.

(56) References Cited

U.S. PATENT DOCUMENTS

| | | | |
|---|---|---|---|
| 2006/0173541 A1 | 8/2006 | Friel | |
| 2008/0181486 A1* | 7/2008 | Spooner | G06T 7/55 382/154 |
| 2009/0104585 A1 | 4/2009 | Diangelo et al. | |
| 2009/0323121 A1* | 12/2009 | Valkenburg | G01C 15/002 358/1.18 |
| 2010/0332196 A1* | 12/2010 | Fisker | G06T 17/00 703/1 |
| 2012/0323345 A1 | 12/2012 | Jonas et al. | |
| 2014/0035182 A1* | 2/2014 | Boyer | B29C 64/386 264/40.1 |
| 2014/0125658 A1* | 5/2014 | Bell | G06T 19/20 345/419 |
| 2014/0125767 A1 | 5/2014 | Bell et al. | |
| 2015/0061170 A1 | 3/2015 | Engel et al. | |
| 2016/0335771 A1* | 11/2016 | Luo | G06T 7/90 |
| 2016/0368220 A1* | 12/2016 | Dimatteo | G05B 19/4097 |
| 2016/0374431 A1 | 12/2016 | Tow | |
| 2017/0066193 A1* | 3/2017 | Kim | B29C 64/386 |
| 2017/0068756 A1* | 3/2017 | Wilsher | G06F 30/18 |
| 2017/0109888 A1* | 4/2017 | de Lima | H04N 13/257 |
| 2017/0144242 A1 | 5/2017 | McQueen et al. | |
| 2017/0287162 A1* | 10/2017 | Wasik | G06T 7/73 |
| 2018/0130255 A1* | 5/2018 | Hazeghi | H04N 5/33 |

OTHER PUBLICATIONS

WO, International Report & Written Opinion, Application No. PCT/US2019/018806, dated Jul. 31, 2019.

Chinese First Office Action, Application No. 201980014512.4 dated Jun. 25, 2021.

Korean Office Action, Application No. 10-2020-7026790 dated Jun. 24, 2021.

Examination Report, Application No. 3091010, dated Oct. 15, 2021.

* cited by examiner

Fig. 8

METHOD AND APPARATUS FOR ADDITIVE MANUFACTURING

RELATED APPLICATIONS

This application claims priority to U.S. Provisional Application Ser. No. 62/632,560, filed on Feb. 20, 2018, the disclosure of the provisional application is hereby incorporated by reference in its entirety and for all purposes.

FIELD

The disclosed embodiments relate generally to additive and subtractive manufacturing and more particularly, but not exclusively, to part location of additively manufactured structures and method for post-processing the same.

BACKGROUND

Three-dimensional (3D) printing, also known as additive manufacturing, is a technique that deposits materials only where needed, thus resulting in significantly less material wastage than traditional manufacturing techniques, which typically form parts by reducing or removing material from a bulk material. While the first 3D printed articles were generally models, the industry is quickly advancing by creating 3D printed articles that may be functional parts in more complex systems, such as hinges, tools, structural elements.

In a typical additive manufacturing processes, a 3D object is created by forming layers of material under computer control. Computer-aided manufacturing (CAM) includes the use of software to control machine tools in 3D space. For some 3D objects, post-processing to further refine the object can include subtractive manufacturing techniques such as drilling, milling, or turning to modify the printed geometry of the 3D object. For example, a milling process using one or more rotary cutters can be used to remove material from the printed 3D object by feeding the cutter into the object at a certain direction.

In order to post-process the printed 3D object, it first must be moved from the 3D printer to a separate hardware device, such as a milling machine or a five-axis router. Alternatively, a cutting tool can be moved to the 3D object, such as by rotating a cutting/turning tool into position relative to the 3D object. Nevertheless, the computer-controlled system must always identify where the 3D object is relative to the tool to avoid even minor deviations in cuts and other processing. Particularly for larger, arbitrarily-shaped objects, it can be difficult for the computer-controlled system to locate the object that either has been moved, for example, on the milling machine or is disposed near a newly placed cutting edge of a turning tool. Furthermore, there is no good way to force a large 3D printed object against a corner or a predefined datum (e.g., such as placing an item on a specific corner of a photocopier) to know the object is in the correct position for any post-processing.

Accordingly, in some conventional systems, after fixing the printed 3D object onto the milling table, an operator provides the exact location of the object to the computer-controlled system using the cutting tools. In other words, the operator assigns a program zero (or starting point) for cutting tools on turning centers—a process known as "touching off" with the tools. However, this approach is not precise and can introduce human error, particularly where the 3D object does not have prominent geometry. If a vehicle-sized part is even slightly out of position, the entire part can be damaged or require significant rework.

In view of the foregoing, there is a need for improvements and/or alternative or additional solutions to improve conventional additive and/or subtractive manufacturing processes for locating structures for any post-processing of a 3D object.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available methods and systems cannot dynamically locate printed parts in machine space (e.g., on a computer controlled mill and/or router), additive and/or subtractive manufacturing processes for scanning and locating structures for any post-processing of a 3D object can prove desirable and provide a basis for a wide range of applications, such as additive and subtractive manufacturing for vehicles and/or architectural structures.

Figure 1:
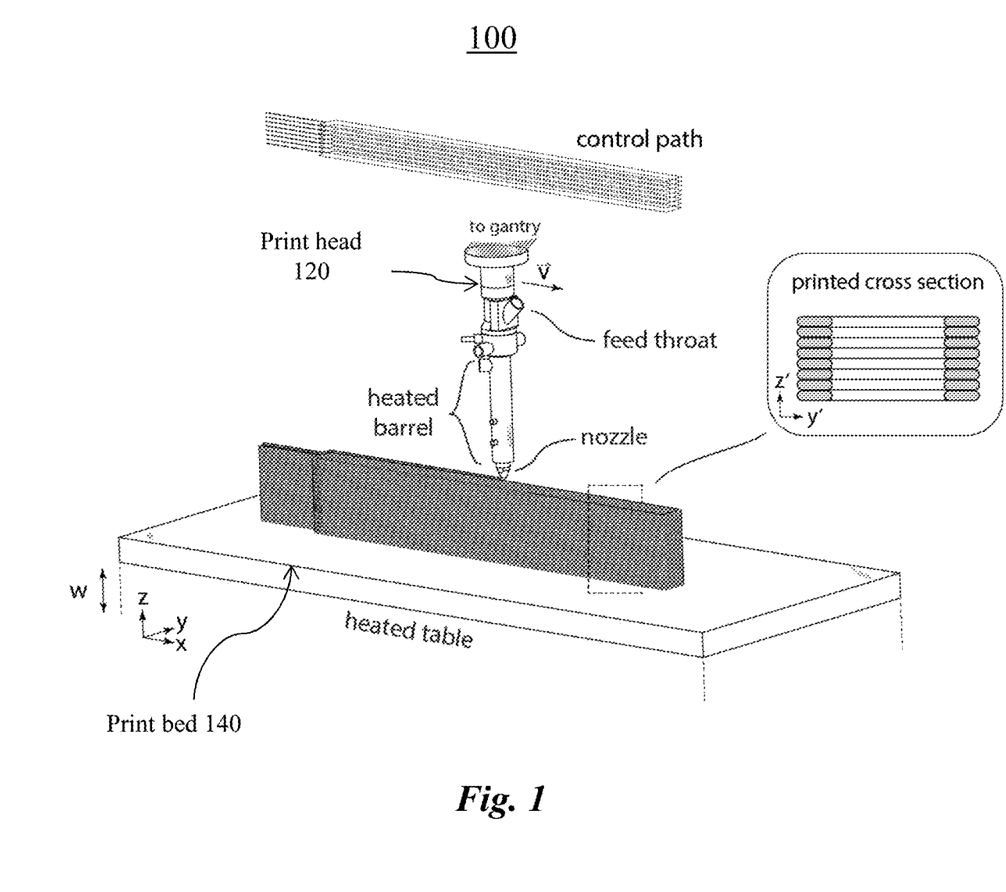
FIG. 1 is an exemplary diagram illustrating a system for additive manufacturing.

FIG. 1 shows an exemplary system 100 for additive manufacturing. The system 100 can print 3D articles via extrusion deposition (or material extrusion). A print head 120 is shown as including a nozzle configured to deposit one or more polymer layers onto a print bed 140 to form the 3D printed article. The print bed 140 can include a heated table and/or previously deposited layers.

Although FIG. 1 shows additive manufacturing as being implemented by the system 100 using extrusion deposition, any other systems or processes for implementing additive manufacturing can be used in the present disclosure. Exemplary processes for additive manufacturing can include binder jetting, directed energy deposition, material jetting, powder bed fusion, sheet lamination, vat photopolymerization, stereolithography, or a combination thereof.

Additive manufacturing for making a 3D article on a large-scale (i.e., typically with at least one dimension greater than 5 feet) can be referred to as large-scale additive manufacturing. A system (or technique) for large-scale additive manufacturing can be referred to as large-scale additive manufacturing system (or technique). Exemplary large-scale additive manufacturing systems include, for example, the Big Area Additive Manufacturing (BAAM) 100 ALPHA available from Cincinnati Incorporated located in Harrison, Ohio, or the Large Scale Additive Manufacturing (LSAM) machine available from Thermwood Corporation located in Dale, Ind. An exemplary system 100 that uses extrusion deposition for large-scale additive manufacturing includes the BAAM 100 ALPHA.

Large-scale additive manufacturing has recently become an area of greater research, use, and technology advancement because of improvements in material properties and increased needs of customized large structures. For example, Local Motors located in Phoenix, Ariz. was the first to use large-scale additive manufacturing, or large-scale extrusion deposition, to print a vehicle.

Although the structures and methods as set forth in the present disclosure are applied to solve technical problems in large-scale additive and/or subtractive manufacturing, the structures and methods can be applied to any smaller-scale additive manufacturing, such as medium-scale and/or small-scale additive manufacturing, without limitation.

Figure 2:
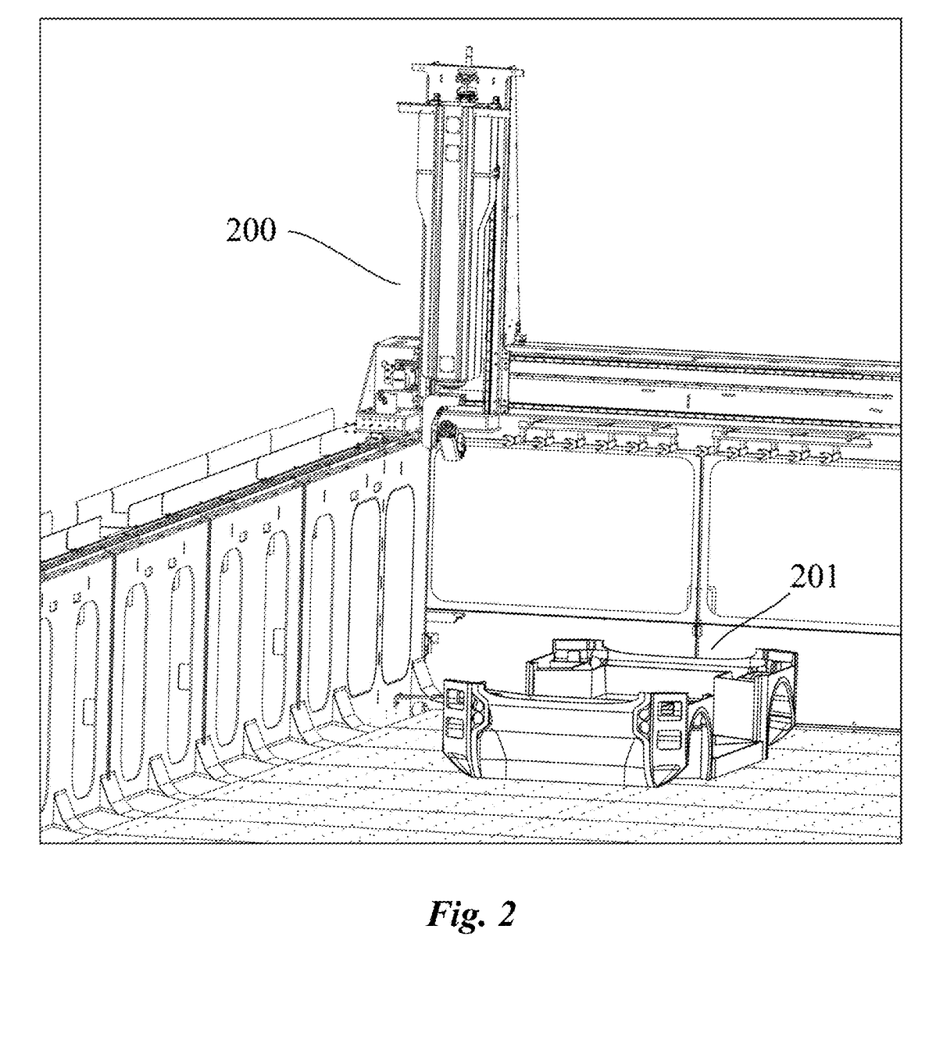
FIG. 2 is an exemplary diagram illustrating an embodiment of a large-scale router for post-processing of a large-scale printed object that can be printed with the manufacturing system of FIG. 1.

For example, turning to FIG. 2, an exemplary router 200 is shown that can post-process a printed object 201. Although not shown, the exemplary router 200 can also operate on small-scale objects and/or other scaled objects without limitation. Accordingly, for exemplary purposes only, the printed object 201 shown in FIG. 2 can represent a large-scale additive manufacturing product produced by the additive manufacturing system 100. However, in a large-scale subtractive deposition process, shape geometry and physical constraints (e.g., a small scanning space) makes it difficult to detect and locate the object in machine space, for example, for computer-controlled processing.

The systems and methods disclosed herein advantageously scan and locate parts in machine space independent of shape geometry. For example, the printed object 201 may have some rounded corners, experience some drooping or deformation through the additive manufacturing process, and/or lack fine 3D geometry due to the material deposited, all of which can make the object 201 difficult to locate in machine space via reference points. Accordingly, in some embodiments, the systems and methods disclosed herein can scan and locate the printed object 201 without manual intervention.

Figure 3A:
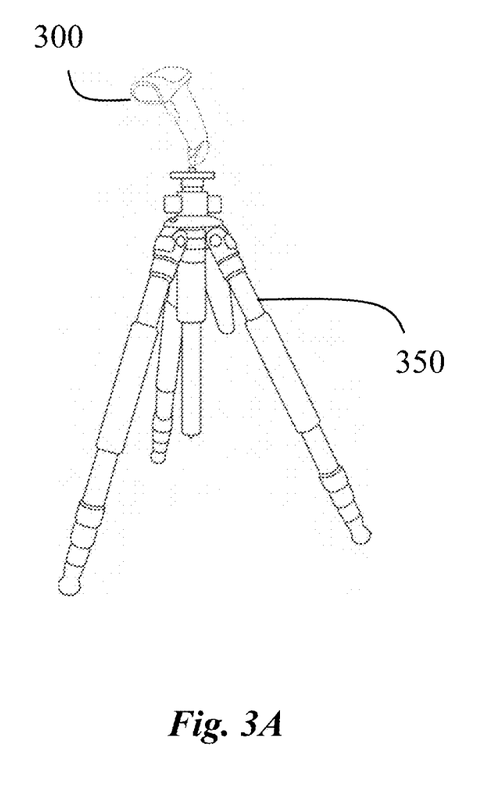
FIG. 3A is an exemplary diagram illustrating an embodiment of a scanner and a support system for locating the large-scale printed object of FIG. 2.

Turning to FIG. 3A, an exemplary scanner 300 is shown. The scanner 300 can measure the three-dimensional shape of an object using projected light patterns and a camera system. For example, structured light scanners can be used or laser scanning using red light-emitting diodes attached to the scanner can be used. Although a single scanner 300 is shown, those of ordinary skill in the art would understand that one or more scanners can be used. The scanner 300 can be maintained on a support system 350, such as a tripod shown in FIG. 3A. The support system 350 can be stationary or placed on a mobile platform (not shown).

Figure 3B:
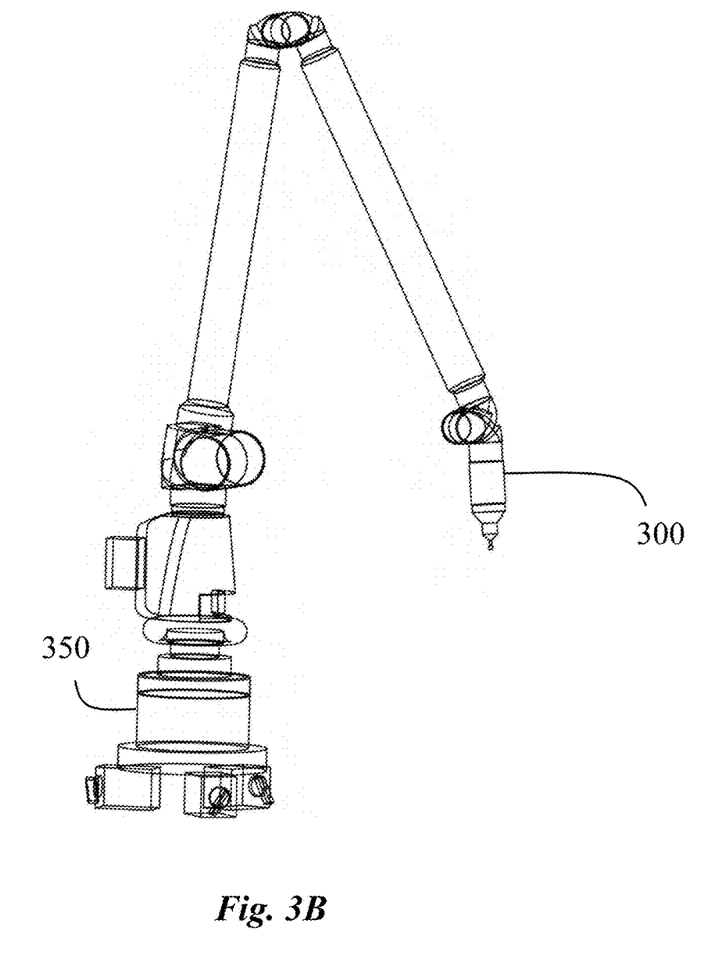
FIG. 3B is an exemplary diagram illustrating another embodiment of a scanner and a support system for locating the large-scale printed object of FIG. 2.

The scanner 300 can include any combination of short-range scanners and/or long-range scanners. Short-range scanners can also include portable handheld scanners, such as shown in FIGS. 3A-3B. In a preferred embodiment, one or more long-range scanners are used for large objects. Long-range scanners advantageously reduce the need to move the scanner around the large part (e.g., around the milling machine) where there may not be a safe walkway for the operator to maneuver. Although a long-range scanner is discussed herein for exemplary purposes, those of ordinary skill in the art understand that one or more short-range scanners can be used. For example, a FaroArm from FARO in Lake Mary, Fla. can be used to scan the printed 3D object.

Figure 4:
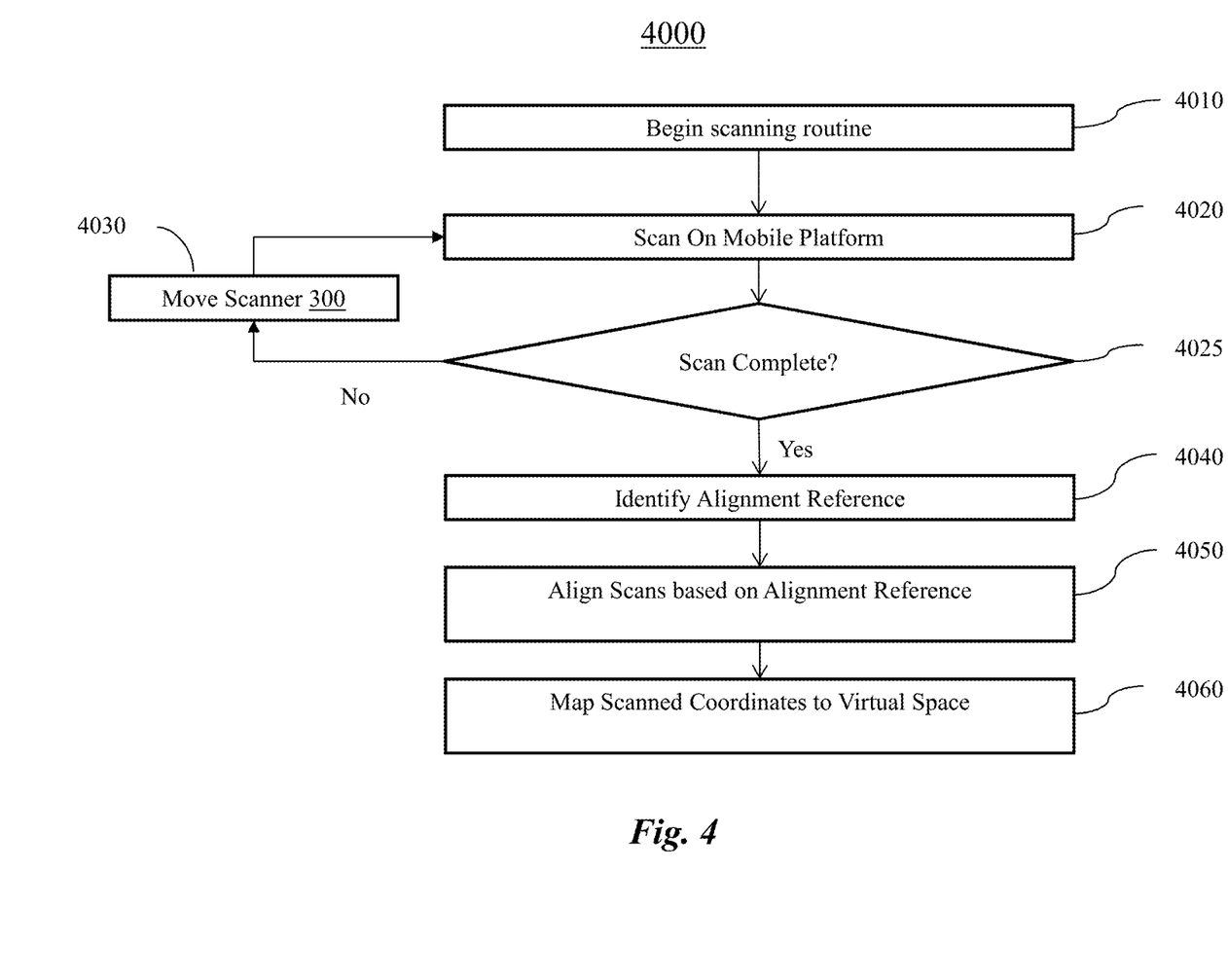
FIG. 4 is an exemplary top-level flow chart illustrating an embodiment of one process for part location using the scanner of FIGS. 3A-B.
Figure 6A:
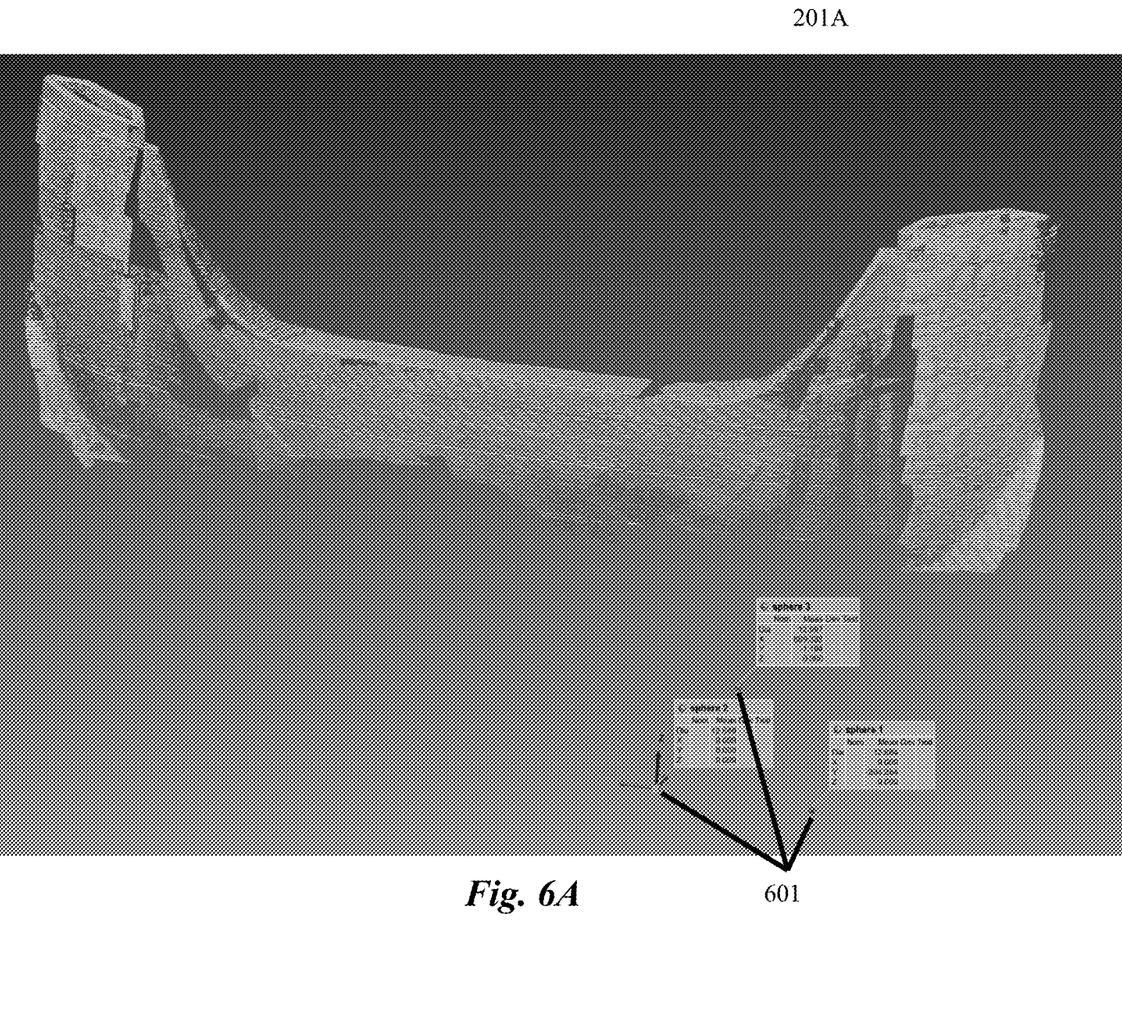
FIGS. 6A-B are exemplary screenshots illustrating one embodiment of the scans produced by the scanner of FIGS. 3A-B.

Turning to FIG. 4, an exemplary method 4000 of scanning and locating the large object 201 using the scanner 300 on a mobile platform is shown. An operator begins the scanning routine, at 4010. Once the operator provides instructions for the scan of the object 201 to begin, the scanner 300 begins a first scan, at 4020. An exemplary scan 201A of a portion of the object 201 is shown in FIG. 6A. In a preferred embodiment, the scanner 300 is selected with a scanning range to include at least one reference point of the object 201 in each scan. Additionally and/or alternatively, a machine coordinate system reference can be included in each scan. For example, three tooling spheres, such as tooling spheres 601 shown in FIG. 6A, can be attached to the router table. Three tooling spheres 601 are used in the preferred embodiment to advantageously lock in both the correct position and orientation of the machine/CAD origin.

If there are portions of the object 201 that are unscanned, at 4025, the scanner 300 is moved, at 4030, to a unique location around the object 201. In some embodiments, the scanner 300 is on a predetermined track that surrounds the object to calibrate the starting position of each scan. The scan continues, at 4020, until all portions of the object 201 have been captured, at 4025. In a preferred embodiment, each scan includes at least one reference point of the object 201, such as the tooling spheres discussed above. The reference points of each scan can be unique or common among scans. However, in yet another embodiment, not all scans need to include the reference points.

Once all portions of the object 201 have been scanned, from each scan, an alignment reference (or locating feature) is determined, at 4040. For example, in some embodiments, the alignment reference includes the reference point of each scan and/or a reference sphere. The alignment reference is a common reference system across one or more images that can be used to track location on an object for aligning the images. For example, adhesive reflective tabs and/or natural features of an object can be used to identify a specific location on an object across one or more images.

Additionally and/or alternatively, the locating feature can include any common reference point surrounding the object 201 that can be determined, at 4040. For example, a corner of a table where the object 201 is placed can be used. Advantageously, each scan includes fiducial markers and at least a portion of the scanned object in the same scan.

Figure 6B:
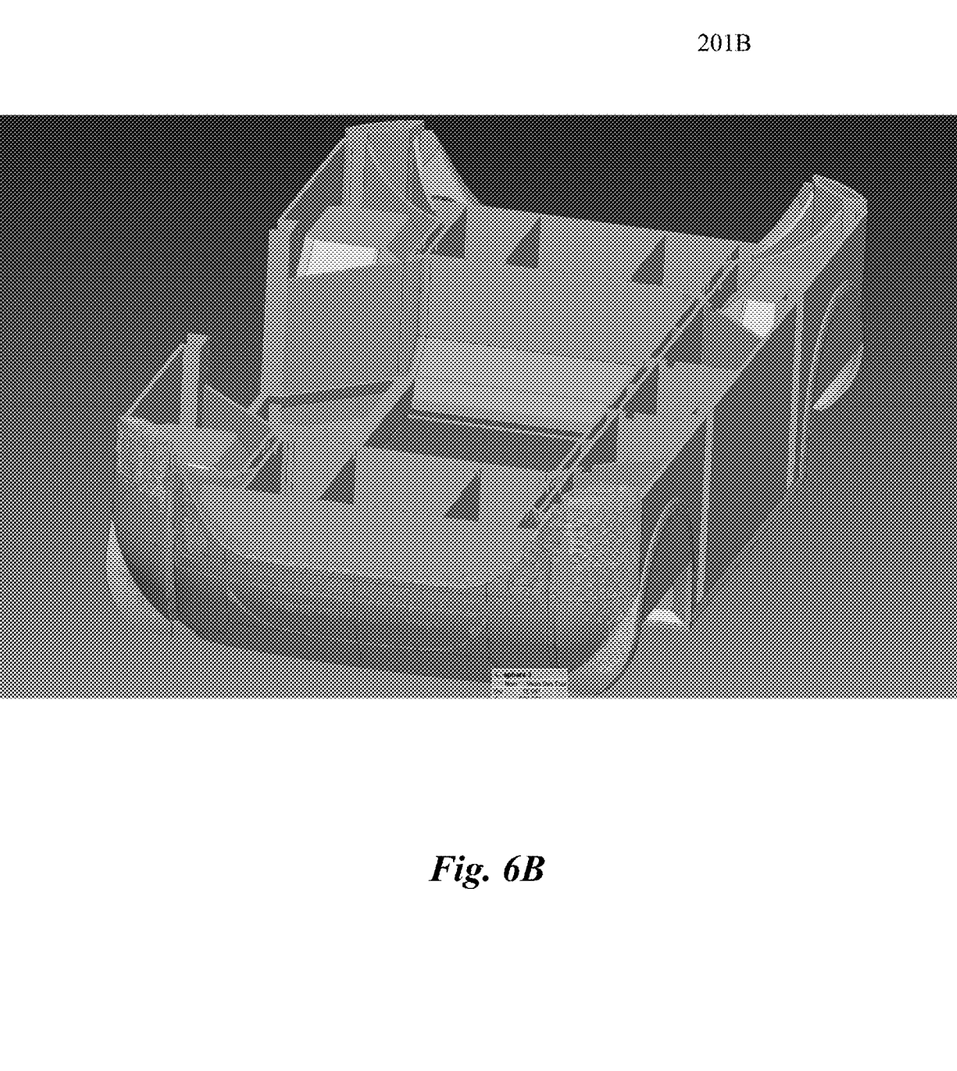
Figure 7:
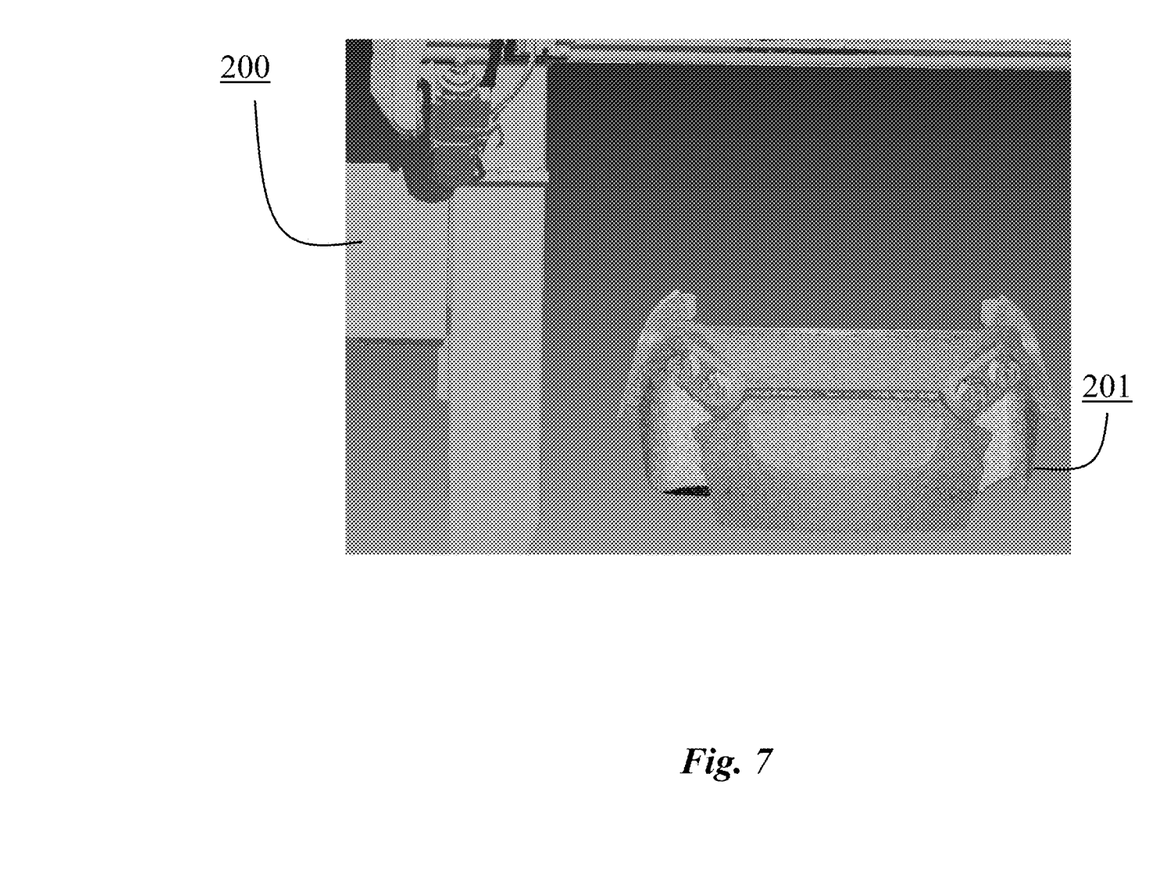
FIG. 7 is an exemplary screenshot illustrating one embodiment of a scan of the router and object of FIG. 2 produced by the scanner of FIGS. 3A-B.

Once the scans are brought into a common reference system, the scans can be aligned and merged, at 4050, to create a complete 3D model of the object, such as shown in FIG. 6B. As shown, the scans are aligned to create a complete 3D model 201B based on tooling spheres 601. In yet another embodiment, if each scan does not include a reference point, a best fit alignment can be used to align individual scans of the object 201. A reference point then can be selected from one of the scans following the best fit alignment to ensure proper alignment to a fiducial marker. In a preferred embodiment, the scans are aligned and merged to a computer aided design (CAD) model (not shown) of the object 201, at 4060. By way of another example, FIG. 7 illustrates an exemplary complete scan of the router 200 and object 201 from FIG. 2. Advantageously, the presence of scanned fiducial makers in the same file as the scanned object 201 enables a translation of physical machine space into a computer coordinate space. In this way, the system advantageously maps virtual coordinates, such as from the CAD file, to physical machine space locations, such as for use with CAM software. In some embodiments, because the alignment reference point can be determined for each scan, at 4040, the alignment of the scans (step 4050) is based on a best fit.

Figure 5:
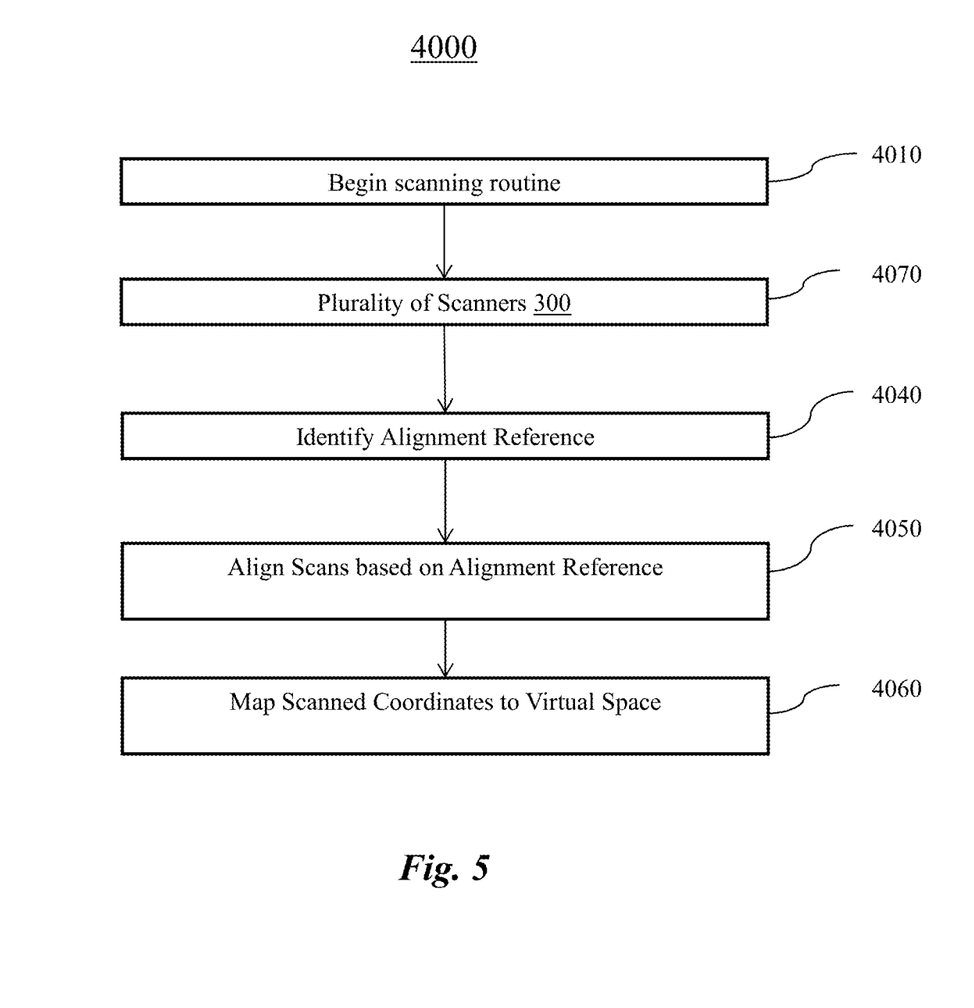
FIG. 5 is an exemplary top-level flow chart illustrating an alternative embodiment of the process for part location of FIG. 4.

Turning to FIG. 5, the exemplary method 4000 scanning and locating a large object using one or more long-range scanners 300 that are each stationary is shown.

An operator begins the scanning routine, at 4010. Once the operator provides instructions for the scan of the object 201 to begin, each scanner 300 scans the object from their own position, at 4070. In a preferred embodiment, each position provides a unique angle of the 3D object 201. As all portions of the object 201 have been scanned from independent scanners, from each scan, a reference point is determined, at 4040. In some embodiments, because the scanner 300 can scan a large volume in a single pass, the reference point can be determined from a subset of the scans as at least a subset of the scans will include a reference point. In a preferred embodiment, each scan includes at least one reference point of the object 201, such as the tooling spheres discussed above. As an additional example, adhesive reflective tabs and/or natural features of an object can be used to identify a specific location on an object across the plurality of scans.

Once the scans are brought into a common reference system, the scans can be aligned and merged, at 4050, to create a complete 3D model of the object. In yet another embodiment, if not all scans include a reference point, a best fit alignment can be used to align individual scans of the object 201. A reference point then can be selected from one of the scans following the best fit alignment to ensure proper alignment to a fiducial marker. In a preferred embodiment, the scans are aligned and merged to a computer aided design (CAD) model (not shown) of the object 201, at 4060. Advantageously, the presence of scanned fiducial makers in the same file as the scanned object 201 enables a translation of physical machine space into a computer coordinate space. In this way, the system advantageously maps virtual coordinates, such as from the CAD file, to physical machine space locations, such as for use with CAM software. In some embodiments, because the alignment reference point can be determined for each scan, at 4040, the alignment of the scans (step 4050) is based on a best fit.

Figure 8:
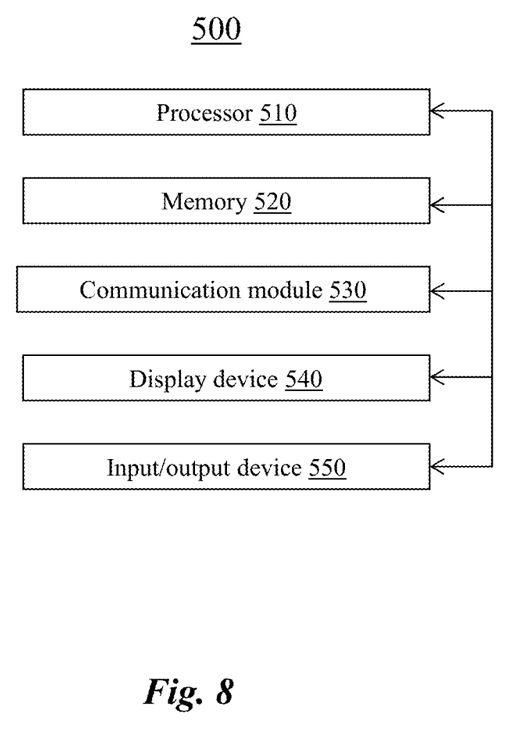
FIG. 8 is an exemplary diagram illustrating an embodiment of a control system for controlling the system of FIGS. 3A-B.

Turning to FIG. 8, a control system 500 for scanning and locating an object during additive and/or subtractive manufacturing is shown. The control system 500 can be configured for controlling the print head 120 (shown in FIG. 1), the router 200 (shown in FIG. 2), and/or the scanner 300 (shown in FIGS. 3A-B). The control system 500 can include a processor 510. The processor 510 can include one or more general-purpose microprocessors (for example, single or multi-core processors), application-specific integrated circuits, application-specific instruction-set processors, graphics processing units, physics processing units, digital signal processing units, coprocessors, network processing units, encryption processing units, and the like.

The processor 510 can execute instructions for implementing the control system 500 and/or scanner 300. In an un-limiting example, the instructions include one or more additive and/or subtractive manufacturing software programs. The programs can operate to control the system 100 with multiple printing options, settings and techniques for implementing additive printing of large components.

The programs can include a computer-aided design (CAD) program to generate a 3D computer model of the object. Additionally and/or alternatively, the 3D computer model can be imported from another computer system (not shown). The 3D computer model can be solid, surface or mesh file format in an industry standard.

The programs can load the 3D computer model, create a print model and generate the machine code for controlling the system 100 to print, scan, locate, and/or post-process the object (e.g., via subtractive manufacturing). Exemplary programs can include LSAM Print $^{3D}$, available from Thermwood Corporation located in Dale, Ind. Additionally and/or alternatively, exemplary programs can include Unfolder Module Software, Bend Simulation Software, Laser Programming and/or Nesting Software available from Cincinnati Incorporated located in Harrison, Ohio.

As shown in FIG. 8, the control system 500 can include one or more additional hardware components as desired. Exemplary additional hardware components include, but are not limited to, a memory 520 (alternatively referred to herein as a non-transitory computer readable medium). Exemplary memory 520 can include, for example, random access memory (RAM), static RAM, dynamic RAM, read-only memory (ROM), programmable ROM, erasable programmable ROM, electrically erasable programmable ROM, flash memory, secure digital (SD) card, and/or the like. Instructions for implementing the control system 500 and/or controlling the scanner 300 can be stored on the memory 520 to be executed by the processor 510.

Additionally and/or alternatively, the control system 500 can include a communication module 530. The communication module 530 can include any conventional hardware and software that operates to exchange data and/or instruction between the control system 500 and another computer system (not shown) using any wired and/or wireless communication methods. For example, the control system 500 can receive computer-design data corresponding to the scans of the scanner 300 via the communication module 530. Exemplary communication methods include, for example, radio, Wireless Fidelity (Wi-Fi), cellular, satellite, broadcasting, or a combination thereof.

Additionally and/or alternatively, the control system 500 can include a display device 540. The display device 540 can include any device that operates to presenting programming instructions for operating the control system 500 and/or presenting data related to the print head 120. Additionally and/or alternatively, the control system 500 can include one or more input/output devices 550 (for example, buttons, a keyboard, keypad, trackball), as desired.

The processor 510, the memory 520, the communication module 530, the display device 540, and/or the input/output device 550 can be configured to communicate, for example, using hardware connectors and buses and/or in a wireless manner.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for locating and scanning a three-dimensional (3D) object in 3D space during additive and subtractive manufacturing, comprising:
   scanning a first portion of the 3D object from a first position via a scanner on a mobile platform;
   determining whether additional portions of the 3D object require scanning;
   moving the scanner via the mobile platform to a second position based on said determination that additional portions of the 3D object require scanning;
   scanning additional portions of the 3D object based on the moved scanner;
   identifying a plurality of tooling spheres of the 3D space for at least one scanned portion of the 3D object, wherein each identified tooling sphere of the identified plurality of tooling spheres comprises a unique reference point from any other identified tooling sphere of the identified plurality of tooling spheres; and
   aligning each scanned portion of the 3D object to generate one or more machine coordinates of the 3D object based on said identified plurality of tooling spheres.

2. The method of claim 1, further comprising translating the generated machine coordinates to virtual space coordinates.

3. The method of claim 2, further comprising locating the 3D object based on the virtual space coordinates for subtractively manufacturing the 3D object.

4. The method of claim 2, wherein said translating includes mapping the machine coordinates to a computer aided design.

5. The method of claim 1, wherein said aligning comprises determining an alignment reference from each portion of the scanned 3D object, the alignment reference being a common reference point across at least two portions of the scanned 3D object, and said aligning is based on the determined alignment reference.

6. The method of claim 5, wherein the alignment reference comprises an adhesive reflective tab or a natural feature of the 3D object.

7. The method of claim 1, further comprising:
   identifying a machine corner that the 3D object is positioned near for at least one scanned portion of the 3D object, and
   wherein said aligning is based on said identified machine corner.

8. The method of claim 1, wherein said aligning is based on a best fit alignment.

9. The method of claim 1, wherein the 3D object is a large-scale additively manufactured object having at least one dimension greater than five feet.

10. A method for locating and scanning a three-dimensional (3D) object in 3D space during additive and subtractive manufacturing, comprising:
    scanning at least a first portion of the 3D object from a first position via a scanner, wherein the scanned portion includes at least one locating feature comprising a plurality of tooling spheres of the 3D space, wherein each tooling sphere of the plurality of tooling spheres comprises a unique reference point from any other tooling sphere of the plurality of tooling spheres;
    generating one or more machine coordinates of the 3D object based on the plurality of tooling spheres; and
    translating the generated machine coordinates to virtual space coordinates.

11. The method of claim 10, further comprising:
    determining whether additional portions of the 3D object require scanning; and
    moving the scanner to a second position based on said determination that additional portions of the 3D object require scanning, said second position including at least one locating feature and wherein said generating includes aligning each portion of the scanned 3D object based on the scanned locating feature.

12. The method of claim 11, wherein said aligning is based on a best fit alignment.

13. The method of claim 10, further comprising locating the 3D object based on the virtual space coordinates for subtractively manufacturing the 3D object.

14. The method of claim 10, wherein the 3D object is a large-scale additively manufactured object having at least one dimension greater than five feet.

15. A system for locating and scanning a three-dimensional (3D) object in 3D space during additive and subtractive manufacturing, comprising:
    one or more laser scanners for scanning at least a first portion of the 3D object from a first position, wherein the scanned portion includes at least one fiducial marker and a plurality of tooling spheres of the 3D space, wherein each tooling sphere of the plurality of tooling spheres comprises a unique reference point from any other tooling sphere of the plurality of tooling spheres;
    a processor operatively coupled to the scanners for generating one or more machine coordinates of the 3D object based on the fiducial marker and the plurality of tooling spheres and translating the generated machine coordinates to virtual space coordinates.

16. The system of claim 15, wherein at least one of said laser scanners is a long-range scanner.

17. The system of claim 15, further comprising a tripod for supporting the one or more laser scanners.

18. The system of claim 15, wherein said one or more laser scanners scan at least a second portion of the 3D object from a second position, said second position including at least one fiducial marker and wherein said processor further aligns each portion of the scanned 3D object based on the scanned fiducial markers.

19. The system of claim 15, wherein the 3D object is a large-scale additively manufactured object having at least one dimension greater than five feet.

* * * * *